July 13, 1965 J. M. BENTLEY 3,194,982

VOLTAGE COMPARATOR CIRCUIT

Filed Nov. 3, 1961 2 Sheets-Sheet 1

WITNESSES

Leon J. Taga

James F. Young

INVENTOR

John M. Bentley

BY Ernest P. Klipfel

ATTORNEY

United States Patent Office 3,194,982
Patented July 13, 1965

3,194,982
VOLTAGE COMPARATOR CIRCUIT

John M. Bentley, Glen Burnie, Md., assignor to Westinghouse Electric Corporation, East Pittsburgh, Pa., a corporation of Pennsylvania
Filed Nov. 3, 1961, Ser. No. 150,064
10 Claims. (Cl. 307—88.5)

The present invention relates generally to voltage comparator circuits and more particularly relates to a circuit for comparing an input signal to another signal while providing greatly improved operational speed and sensitivity through the utilization of semiconductor devices.

The present invention provides circuitry for increasing the sensitivity of voltage comparators and their speed of operation. At the same time a high input impedance is maintained.

Briefly, a signal responsive to the difference between two quantities, or a reference and a quantity to be sensed is added to a bipolar symmetrical signal which in and of itself is insufficient to exceed the predetermined current breakover level of a pair of oppositely poled semiconductor devices. Upon the combination exceeding the current breakover level of one of the devices, output means responsive to the breakover of the particular device indicates the polarity of the difference signal.

An object of the present invention is to provide an improved voltage comparator circuit.

Another object of the present invention is to provide a circuit for comparing two signals wherein the gain of the system is greatly improved by means of a semiconductor device having a characteristic curve exhibiting a negative resistance region.

Another object of the present invention is to provide a circuit capable of comparing a signal to be sensed with a reference value and greatly amplifying the resultant difference signal.

Another object of the present invention is to provide a circuit for comparing two signals wherein the polarity of the difference indicates the larger of the two signals.

Further objects and advantages of the present invention will be readily apparent from the following detailed description taken in conjunction with the drawing, in which.

Figure 1:
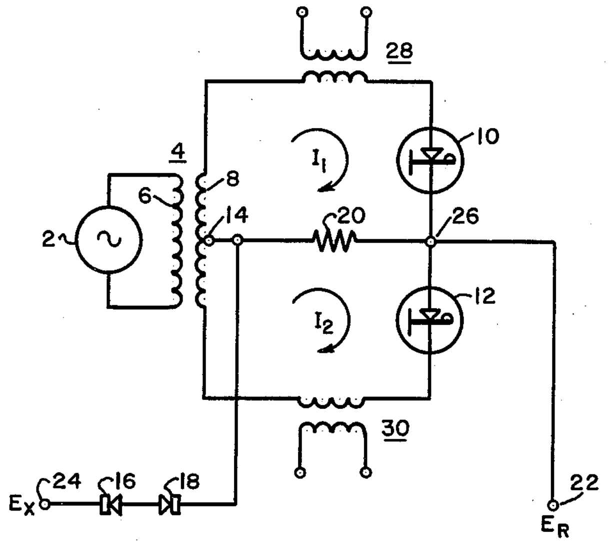
FIGURE 1 is an electrical schematic diagram of an illustrative embodiment of the present invention.

Referring to FIG. 1, a bipolar symmetrical waveform generator 2 is connected through a transformer 4, having a primary winding 6 and secondary winding 8, to a first semiconductor device 10 and a second semiconductor device 12. The secondary winding 8 has a center tap connection 14. Input means comprising a pair of diodes 16 and 18 connected back to back and a resistive element 20 are connected in series circuit combination across terminal means 22 and 24 for connection to a reference value $E_R$ applied to terminal 22 and for connection to an input signal $E_X$ at terminal 24. The resistive element 20 is further connected between the center tap connection 14 and the junction 26 formed by the serial connection of the semiconductor devices 10 and 12. A first output transformer 28 connects the opposite end of the semiconductor device 10 to one end connection of the secondary winding 8 while a second output transformer 30 connects the opposing opposite end of the semiconductor device 12 to the other end connection of the secondary winding 8.

Figure 2:
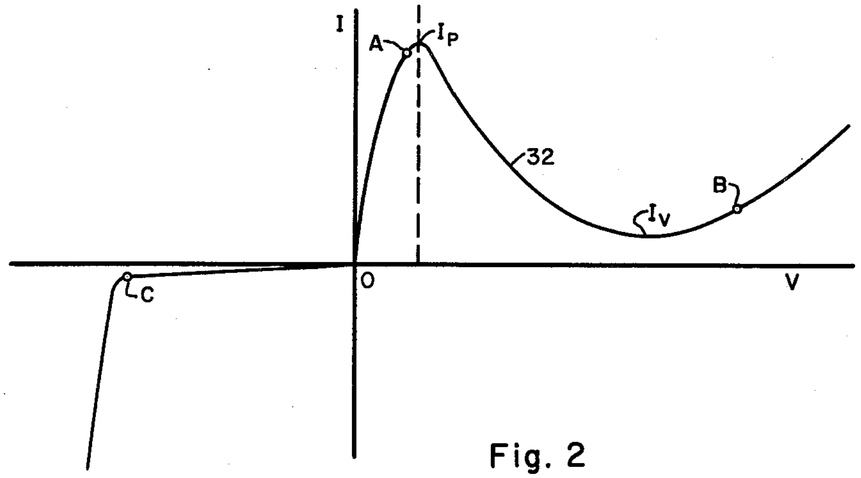
FIG. 2 is a characteristic curve of a device utilized in the illustrative embodiment of FIG. 1.

A characteristic current-voltage curve of the semiconductor devices 10 and 12 is shown in FIG. 2. For a reverse voltage across the semiconductor device it can be seen that the voltage builds up rapidly while current in the reverse direction is negligible until a characteristic breakdown potential is exceeded at which time current is permitted to flow freely. The breakdown is nondestructive. In the forward direction of voltage across the semiconductor device, the current therethrough increases to a sharp maximum $I_P$ on a portion of the characteristic curve referred to as the low voltage side. Further increase in the voltage across the diode results in the negative resistance portion of the characteristic curve wherein the current through the device drops to a deep and broad minimum referred to as the valley current $I_V$. Still further increase in the voltage across the device causes the current to increase again on a portion of the characteristic curve to be referred to as the high voltage side to a maximum value indicated at B determined by the circuit parameters. The breakover current level as determined by the peak tunneling current $I_P$ is hereinafter referred to as the threshold or current breakover level of the device. Each semiconductor device 10 and 12 is selected to have a breakover level which occurs with a lesser forward voltage magnitude thereacross than the magnitude of the reverse voltage necessary for breakdown.

One such semiconductor device exhibiting a characteristic I–V curve, as shown in FIG. 2, is as described and claimed in a copending application Serial No. 29,464, now Patent No. 3,018,423, entitled Semiconductor Device, filed May 16, 1960, assigned to the same assignee as the present application. As more fully described therein, the semiductor device is of a two-terminal, three-zone configuration comprising (1) a first region of a semiconductor material of a first type of semiconductivity, the material of said first region being doped to a high concentration of carriers whereby the material is degenerate, (2) a second region of a material of second type of semiconductivity having a first surface thereof disposed upon and contiguous with one surface of said first-named region and forming therewith a first narrow PN junction characterized by quantum mechanical tunneling of electrons while a small potential difference exists thereacross, (3) the second region having a gradient in the carrier concentration therein between two portions thereof, (4) the portion of the second region adjacent the first-named region being doped to a high degree of carrier concentration whereby the material of the last-named portion is degenerate, (5) a third region of a semiconductor material of the first type of semiconductivity disposed upon and contiguous with the surface of the other portion of said second region and forming therewith a second PN junction, (6) a portion of the second region adjacent the third region being doped to a carrier concentration whereby the last-named portion of the second region is almost degenerate, said third region being doped to a carrier concentration whereby the material of the third region is degenerate, and ohmic contacts disposed upon and contiguous with one surface of said first region, hereinafter referred to as the anode, and one surface of the third region, hereinafter referred to as the cathode. Of course, any suitable device exhibiting the characteristic curve 32 shown in FIG. 2 may be used.

Referring again to FIG. 1, it can be seen that a first current loop indicated by the arrows $I_1$ is formed by connecting the anode of the semiconductor device 10 to one end of the secondary winding 8 through the primary winding of the output transformer 28 while the cathode of the semiconductor device 10 is connected to the center tap connection 14 through the resistive element 20. In the same manner, the anode of the semiconductor device 12 is connected to the center tap connection 14 through the resistive element 20 and the cathode of the semiconductor device 12 is connected to the opposite end connection of the secondary winding 8 through the primary winding of the second output transformer 30.

It can be seen that in the absence of the input signal $E_X$ and the reference signal $E_R$ or in their presence when both are of equal magnitudes the loop currents $I_1$ and $I_2$ will be identical with each canceling the other through the common side formed by the resistive element 20.

In this condition, the generator 2 is selected to be of a magnitude wherein the pulse appearing across each semiconductor device 10 and 12 is slightly less than the current breakover level $I_P$. The current through each device 10 and 12 on alternate half cycles of the generator 2 is chosen to be only sufficient to provide a current A through each device as shown by the characteristic curve 32 of FIG. 2. Neither device has sufficient current flow therethrough to breakover in the absence of a bias current provided by the input means. The semiconductor devices 10 and 12 are selected to be matched in their forward characteristics from point O to the current threshold level $I_P$ to within the resolution required by the voltage comparator.

In operation, the input signal $E_X$ and the reference signal $E_R$ are applied to their respective input terminals 22 and 24. The resulting current that will flow through the resistive element 20 as a result of the difference between the input signal to be sensed and the reference signal will bias one of the semiconductor devices 10 and 12 in the forward direction and the other in the reverse direction as determined by the polarity of the difference between the reference signal and the sensed signal. The device biased in the forward direction then operates between point O and the current threshold level $I_P$ of FIG. 2 and the other device is operating between point O and breakdown potential level C of FIG. 2. The combination of forward biasing of one of the semiconductor devices and the loop current therethrough from the generator 2 will be sufficient to exceed the current threshold level $I_P$ of the forward biased semiconductor device. The combination of currents across the other semiconductor device will be in opposition to each other and accordingly the current threshold level $I_P$ of the other semiconductor device will not be exceeded.

Referring to FIG. 2, it can be seen that the combination of currents through the semiconductor device biased in the forward direction by the difference signal will force that semiconductor device to swing through its negative resistance region towards point B. This sudden change in current through the forward biased semiconductor device is detected in turn by its respective output transformer 28 and 30 so that an output signal will result from the associated output transformer connected to the forward biased semiconductor device. As the bipolar symmetrical waveform supplied by the generator 2 goes through its cycle, the system is returned to the biased condition imposed by the relative difference between the input signal $E_X$ and the reference signal $E_R$. Accordingly, an output signal is provided which is indicative of which signal is larger, the input signal $E_X$ or the reference signal $E_R$, as determined by the polarity of the difference. Upon breakover of the forward biased semiconductor device, a current surge occurs in its associated output transformer with an output from one output transformer indicating the reference voltage $E_R$ to be larger and an output from the other output transformer indicating that the input signal $E_X$ is greater than the reference voltage $E_R$.

Figure 3:
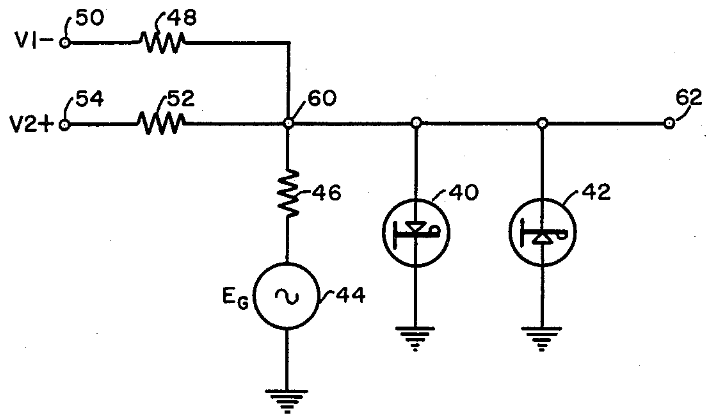
FIG. 3 is an electrical schematic diagram of an alternate embodiment of the present invention.

An alternate embodiment is shown in FIG. 3. A first semiconductor device 40 and a second semiconductor device 42 are poled opposite to each other and parallelly connected. A bipolar symmetrical waveform generator 44 providing a voltage $E_G$, and a resistive element 46 are connected in series circuit combination across the semiconductor devices 40 and 42. A first input means comprising an input resistor 48 connects a common or summing junction 60 to first input terminal means 50 where a first input voltage V1 of predetermined polarity is connected (not illustrated). A second input means comprising an input resistor 52 connects the summing junction 60 to second input terminal means 54 adapted for connection to a second signal voltage of opposite polarity V2 (not illustrated). An output means herein illustrated as an output terminal 62 is connected to the summing junction 60 and provides an output voltage in accordance with the voltage condition across each semiconductor device 40 and 42.

The two voltages to be compared, V1 and V2, are summed through input resistors 48 and 52, chosen to be of equal magnitude, although it is not necessary for proper operation of the present invention. Consequently, the voltages V1 and V2 must be of opposite polarity in order to effect a null at the summary point 60. Any difference in the absolute values of input signals E1 and input signals E2 will develop a potential at the summing junction 60 that is either positive or negative in polarity depending upon their relative magnitudes. It is the difference signal or potential that is to be detected by the present invention, and the uniqueness of the present invention lies in the use of the semiconductor devices to detect this difference and to supply a greatly amplified information output signal concerning its polarity.

Figure 4:
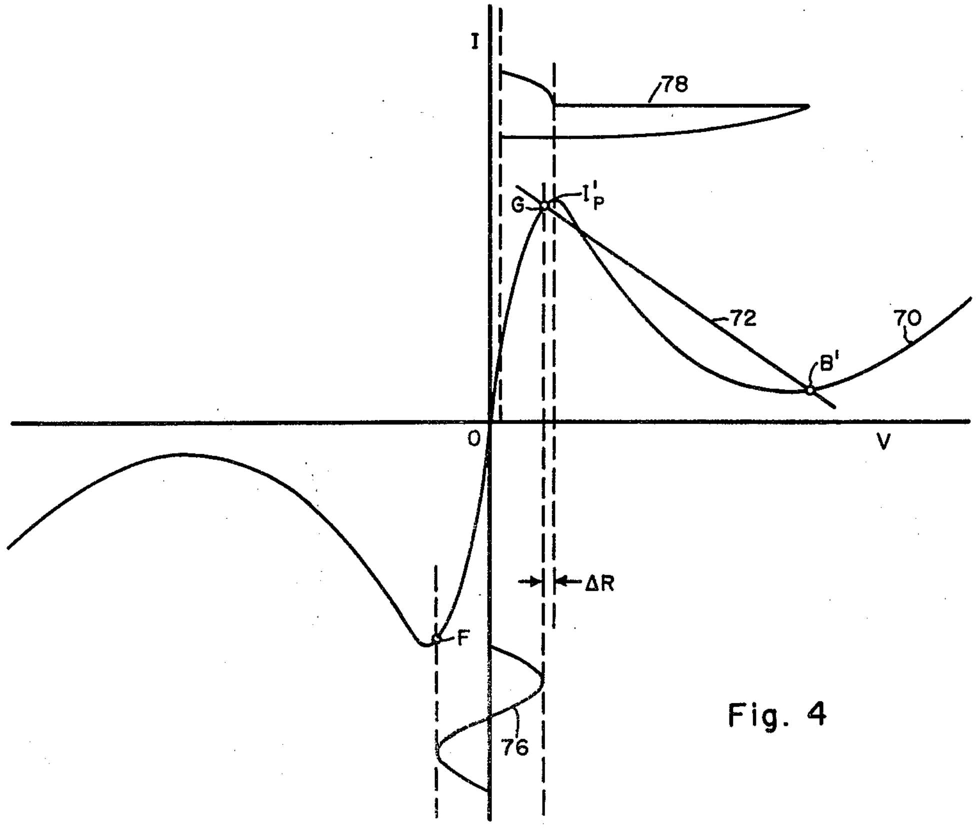
FIG. 4 is a characteristic curve of a combination of devices utilized in the alternate embodiment of FIG. 3.

A characteristic curve of the combination of oppositely poled semiconductor devices 40 and 42 is illustrated in FIG. 4. Again each semiconductor device 40 and 42 is selected to have a breakover level which occurs with a lesser forward voltage magnitude thereacross than the magnitude of the reverse voltage necessary for breakdown. From the characteristic curve 70 shown therein, it is readily apparent that the first semiconductor device 40 is energized in the forward direction upon voltage at the summing junction being positive in polarity while the semiconductor device 42 has a voltage thereacross in its forward direction upon the voltage at the summing junction having a negative polarity. The bipolar symmetrical waveform generator 44 is selected along with the magnitude of the resistive element 46 to provide an alternating voltage at the summing junction 60 equivalent to $(E_G - E_{R46})$. As seen from FIG. 4, this magnitude is insufficient in either direction to exceed the peak current threshold level of either semiconductor device 40 or 42. The characteristic curve of each semiconductor device is matched so that the current threshold levels are the same within the accuracy requirements of the system. It is readily apparent that to assist in matching the semiconductor diodes each may be back-biased to an extent determined by the intersection of the effective load line 72 at point B′. Matching of the semiconductor devices is only important from the zero point through the current threshold level $I_P'$ of each device.

In operation, with zero voltage developed at the summing junction 60 on the absence of the first input signal V1 and the second input signal V2 or the cancellation of each other, the bipolar symmetrical waveform generator $E_G$ and its resistive element 46 are adjusted to allow an excursion of the combined characteristic as shown in FIG. 3 from point F to point G. Such an excursion is illustrated at 76. However, with a potential at the summing junction 60 equal to or in excess of $\Delta R$, the resolution of the comparator, the output waveform of the comparator is that as shown at 78. Here, advantage is taken of the negative resistance characteristics of the semiconductor devices as hereinbefore described with reference to FIG. 1 to obtain a circuit gain that can easily exceed 200. It is to be noted that if the potential difference at the summing junction 60 of FIG.

3 is opposite in polarity to that shown at 78, the output pulse at the output terminal 62 will be on the opposite half cycle of the bipolar symmetrical waveform, thereby indicating the relative magnitude of the two input potentials V1 and V2 to within the value of the resolution of the circuit, ΔR.

Accordingly, a circuit for comparing the relative magnitude of two input signals or an input signal to a reference signal has been provided having a substantial gain, utilizing no moving parts, but rather composed of static devices, and providing a switching time comparable to the inherent switching capabilities of any device utilizing the quantum mechanical tunneling effect.

While the present invention has been described with a degree of particularity for the purposes of illustration, it is to be understood that all alterations, equivalents, and modifications within the spirit and scope of the present invention are herein meant to be included.

I claim as my invention:

1. A voltage comparator circuit comprising, in combination; a pair of semiconductor devices each having a characteristic I–V curve exhibiting a current breakover level and a negative resistance region for a preselected forward voltage thereacross; each said device having a reverse breakdown level of larger magnitude than said forward voltage for a preselected reverse voltage thereacross; means for connecting said semiconductor devices in circuit relationship with mutually opposite terminals being commonly coupled together; means for connecting an alternating waveform having a substantially constant amplitude across said semiconductor devices, said constant amplitude selected to be a predetermined amount less than the current breakover levels of said devices; means responsive to the difference between an input signal and a reference value for providing a signal having a magnitude proportional to the difference and a polarity determined by their relative magnitudes; means for combining said alternating waveform and said difference signal across said semiconductor devices whereby the combination selectively exceeds the current breakover level of said semiconductor devices in accordance with the polarity of said difference signal; and output means responsive to the reduction in current through one of said devices as the combination exceeds its current breakover level.

2. A circuit for comparing an input voltage to a reference voltage comprising, in combination; a pair of semiconductor devices each having a characteristic I–V curve exhibiting a current breakover level and a negative region for a preselected forward voltage thereacross, each said device having a reverse breakdown level of larger magnitude than said forward voltage for a predetermined reverse voltage thereacross; means for alternately energizing said semiconductor devices in the forward direction to a preselected level less than said current breakover level; and summing means responsive to the difference between said input voltage and said reference voltage providing a signal proportional to the difference between said input voltage and said reference voltage and having a polarity in accordance with the relative magnitudes of said signal voltage and said reference voltage; means for combining said means for alternately energizing said semiconductor devices and said summing means for exceeding the current breakover level of a selected semiconductor device of said pair of semiconductor devices; and output means responsive to the breakover of said selected device.

3. A circuit for comparing an input signal to a reference signal comprising, in combination; a first and second semiconductor device each having a characteristic I–V curve having substantially similar current breakover levels and exhibiting a negative resistance region for a preselected forward voltage thereacross; each said device having a Zener breakdown level greater in magnitude than said breakover level for a preselected reverse voltage thereacross; means for alternately energizing said semiconductor devices to a preselected level less than the current breakover level of said devices; means responsive to the polarity and magnitude of the difference between said input signal and said reference signal for selectively combining with said last-mentioned means to breakover said first semiconductor device when the difference is of predetermined polarity and to breakover said second semiconductor device when the difference is of opposite polarity; and output means responsive to the condition of said semiconductor devices.

4. A circuit for comparing an input voltage to a reference voltage comprising, in combination; a first semiconductor device and a second semiconductor device each having a characteristic I–V curve including a current breakover level and exhibiting a negative resistance region for a preselected forward voltage thereacross; each said device having a Zener breakdown level greater in magnitude than said breakover level for a preselected reverse voltage thereacross; driving means for alternately energizing said semiconductor devices to a preselected level slightly less than the current breakover level of said devices; input means for combining with said driving means to selectively breakover said semiconductor devices in response to the difference and polarity between the input signal and the reference signal; and output means responsive to the breakover of said semiconductor devices for providing an output signal.

5. A circuit for comparing an input signal to a reference signal comprising, in combination; a first and a second semiconductor device each having a current breakover level of matched value and having a characteristic current-voltage curve exhibiting a negative resistance region for a preselected forward voltage thereacross and a reverse breakdown voltage greater in magnitude than said breakover level; said semiconductor devices connected in series circuit combination; means for alternately energizing said semiconductor devices to a preselected level just below said current breakover level; means responsive to the difference between said input signal and said reference signal for providing a signal having a magnitude proportional to the difference and a polarity related to the relative magnitudes of said signals; means for combining said difference signal with said energizing means for selectively exceeding the current breakover level of one said semiconductor device when said difference signal is of predetermined polarity and exceeding the current breakover level of the other said device when said difference signal is of opposite polarity.

6. A circuit for comparing an input signal to a reference signal comprising, in combination; a pair of semiconductor devices having substantially identical current breakover levels and each having a characteristic I–V curve exhibiting a negative resistance region in the forward voltage quadrant and having a reverse breakdown in the reverse voltage quadrant which is larger than said breakover levels; transformer means including a primary winding and a secondary winding having a center tap connection; means for connecting said semiconductor devices in series circuit combination across said secondary winding; means energizing said primary winding for alternately driving said semiconductor devices to a predetermined level less than their current breakover level; a resistance element connected between said center tap connection and the junction between said semiconductor devices; and input means connected across said resistance elements for comparing said input voltage to said reference potential, whereby additional current will flow in a preselected semiconductor device in response to the polarity of said difference.

7. A circuit for comparing an input signal to a reference signal comprising, in combination; a first an a second semiconductor device each having a predetermined current breakover level of predetermined magnitude and exhibiting a negative resistance for a predetermined range of forward voltage thereacross; each said device having a Zener breakdown greater than said breakover level for a preselected reverse voltage thereacross; driving means including a primary winding and a secondary winding having a center tap connection; means for connecting said semiconductor devices in series circuit combination across said secondary winding; means connected between said center tap connection and the junction between said semiconductor devices for comparing said input voltage to said reference potential and providing a signal current through said semiconductor devices; the combination of current from said last-mentioned means and said driving means exceeding the current breakover level of a selected semiconductor device for a predetermined difference between said input signal and said reference signal; and output means responsive to the reduction in current through said preselected semiconductor device upon breakover thereof; said output means comprising a transformer for each semiconductor device and having a primary winding connected in series circuit combination with its respective semiconductor device and a secondary winding responsive to current flow through said primary winding upon breakover of its respective device.

8. A voltage comparator circuit comprising, in combination; a first and a second semiconductor device connected in parallel circuit relationship with mutually opposite terminals thereof being commonly connected; each said semiconductor device having a characteristic I–V curve exhibiting substantially identical current breakover levels and a negative resistance region for a potential of predetermined polarity thereacross; each said device having a reverse breakdown level of larger magnitude than said potential; a sinusoidal voltage source and a series resistor connected in series circuit combination across said semiconductor devices; output means connected across said semiconductor devices; and input means for combining a difference signal responsive to the difference between an input signal and a reference signal with said sinusoidal voltage source for exceeding the current breakover level of a selected semiconductor device in response to a predetermined polarity of the difference signal.

9. The apparatus of claim 8 wherein said input means comprises a first input circuit and a second input circuit; an input resistor for each input circuit; means for connecting a voltage of predetermined polarity to said first input circuit; means for connecting a voltage of opposite polarity to said second input circuit; and summing means for providing a difference signal responsive to the difference between said signal voltage of said first input circuit and the reference voltage applied to said second input circuit.

10. The apparatus of claim 9 wherein said sinusoidal voltage source is selected to have a magnitude slightly less than the current threshold breakover level of said semiconductor devices when a null is present at said summing junction, whereby the magnitude of said sinusoidal voltage source is insufficient to alone exceed the breakover current level of said semiconductor devices.

References Cited by the Examiner

UNITED STATES PATENTS 2,614,140 10/52 Kreer ______________ 307—88.5 X

OTHER REFERENCES

"Tunnel Diode Logic Circuits," by W. F. Chow, Electronics, June 24, 1960, pages 103 to 107 (Fig. 3 relied upon).

"Comparator Using Esaki Diode," by W. K. French, IBM Technical Disclosure Bulletin, vol. 3, No. 8, page 26, January 1961.

JOHN W. HUCKERT, *Primary Examiner.*